(12) United States Patent
Holt

(10) Patent No.: US 7,468,135 B2
(45) Date of Patent: Dec. 23, 2008

(54) PORTABLE TANK WASTEWATER TREATMENT SYSTEM AND METHOD

(75) Inventor: Karl K. Holt, Hartland, WI (US)

(73) Assignee: Engineered Solutions, Inc., Hartland, WI (US)

( * ) Notice: Subject to any disclaimer, the term of this patent is extended or adjusted under 35 U.S.C. 154(b) by 0 days.

(21) Appl. No.: 11/849,826

(22) Filed: Sep. 4, 2007

(65) Prior Publication Data

US 2008/0023412 A1     Jan. 31, 2008

Related U.S. Application Data

(63) Continuation-in-part of application No. 10/930,148, filed on Aug. 31, 2004, application No. 11/849,826, filed on Sep. 4, 2007, which is a continuation-in-part of application No. 10/764,245, filed on Jan. 23, 2004, now Pat. No. 7,264,727.

(60) Provisional application No. 60/503,033, filed on Sep. 15, 2003, provisional application No. 60/442,446, filed on Jan. 25, 2003.

(51) Int. Cl.
*C02F 3/00*     (2006.01)
(52) U.S. Cl. ........................ 210/620; 210/760; 210/150; 210/220; 210/241
(58) Field of Classification Search ................. 210/620, 210/760, 150, 220, 241–242.2
See application file for complete search history.

(56) References Cited

U.S. PATENT DOCUMENTS 1,563,850 A    12/1925   Hartman
1,845,670 A    2/1932   Lebrun (Continued)

FOREIGN PATENT DOCUMENTS

JP        9-99890 A   *   4/1997

(Continued)

*Primary Examiner*—Chester T Barry
(74) *Attorney, Agent, or Firm*—Michael Best & Friedrich LLP

(57) ABSTRACT

A portable wastewater treatment system comprising a wastewater holding tank having an interior adapted to hold wastewater, and a generator positioned to provide ozone, oxygen, or a combination of the two to the interior of the holding tank. In one embodiment, the holding tank comprises a gray-water tank, and the system further comprises a non-potable water tank having an interior. In this embodiment, the system further includes a second generator positioned to provide ozone, oxygen, or a combination of the two to the interior of the non-potable water tank and a conduit coupling the gray-water tank to the non-potable water tank. The system can further include a black-water tank having an interior, a third generator positioned to provide ozone, oxygen, or a combination of the two to the interior of the black-water tank, and a conduit coupling the black-water tank to the non-potable water tank. The system can further include a toilet having an inlet and an outlet, a first conduit coupling the non-potable water tank to the inlet of the toilet, and a second conduit coupling the outlet to the black-water tank. The system can also include a potable water tank, a point of water usage coupled to the potable water tank, and a fourth generator positioned to provide ozone, oxygen, or a combination of the two to the potable water tank.

9 Claims, 7 Drawing Sheets

U.S. PATENT DOCUMENTS

| | | | |
|---|---|---|---|
| 3,365,383 | A | 1/1968 | Blair |
| 3,942,020 | A | 3/1976 | Ciambrone |
| 4,250,040 | A | 2/1981 | LaRaus |
| 4,386,055 | A | 5/1983 | McBride |
| 4,626,876 | A | 12/1986 | Miyagawa et al. |
| 4,970,056 | A | 11/1990 | Wooten et al. |
| 5,106,495 | A | 4/1992 | Hughes |
| 5,106,589 | A | 4/1992 | Conrad |
| 5,190,648 | A | 3/1993 | Ramsauer |
| 5,221,470 | A | 6/1993 | McKinney |
| 5,332,511 | A | 7/1994 | Gay et al. |
| 5,384,048 | A | 1/1995 | Hazen et al. |
| 5,422,043 | A | 6/1995 | Burris |
| 5,490,935 | A | 2/1996 | Guy |
| 5,549,818 | A | 8/1996 | McGrew, Jr. |
| 5,641,461 | A | 6/1997 | Ferone |
| 5,788,836 | A | 8/1998 | Davis |
| 5,810,514 | A | 9/1998 | Suchecki, Jr. |
| 5,834,031 | A | 11/1998 | Martin et al. |
| 6,096,203 | A | 8/2000 | Drewery |
| 6,129,850 | A | 10/2000 | Martin et al. |
| 6,159,371 | A | 12/2000 | Dufay |
| 6,200,470 | B1 | 3/2001 | Romero et al. |
| 6,217,833 | B1 | 4/2001 | Kolu |
| 6,475,395 | B1 | 11/2002 | Schmit et al. |
| 6,500,332 | B2 | 12/2002 | Martin et al. |
| 6,511,638 | B2 | 1/2003 | Matsuzaki |
| 6,780,318 | B2 | 8/2004 | Fife et al. |
| 6,800,205 | B2 | 10/2004 | Collins |
| 6,835,312 | B2 | 12/2004 | Perriello et al. |
| 6,861,248 | B2 | 3/2005 | Dale et al. |
| 6,863,818 | B2 | 3/2005 | Daigger et al. |
| 6,942,800 | B2 | 9/2005 | Jungbauer |
| 7,118,678 | B2 | 10/2006 | Porat |
| 7,235,178 | B2 * | 6/2007 | Hamann et al. ............. 210/623 |
| 7,264,727 | B2 | 9/2007 | Holt |
| 2002/0190404 | A1 | 12/2002 | Baarda |
| 2003/0113908 | A1 | 6/2003 | Hussey, III et al. |
| 2003/0234217 | A1 | 12/2003 | Perriello et al. |

FOREIGN PATENT DOCUMENTS

| | | |
|---|---|---|
| JP | 10151480 | 6/1998 |
| JP | 11253942 | 9/1999 |

* cited by examiner

PORTABLE TANK WASTEWATER TREATMENT SYSTEM AND METHOD

CROSS-REFERENCE TO RELATED APPLICATION

The present application is a continuation-in-part of application Ser. No. 10/930,148 filed on Aug. 31, 2004, which claims the benefit of U.S. Provisional Application No. 60/503,033 filed Sep. 15, 2003. In addition, this application is a continuation-in-part of application Ser. No. 10/764,245 filed on Jan. 23, 2004, which claims the benefit of U.S. Provisional Application No. 60/442,446 filed Jan. 25, 2003. All of the prior applications listed in this paragraph are hereby incorporated by reference in their entirety.

BACKGROUND

The present invention relates to septic systems and to components that make up such systems. More particularly, it relates to an improved method and apparatus for remediating the formation of a bio-mat that can occur in the absorption field component of a private on-site wastewater treatment system.

Septic systems and septic system components are well known in the art. Such systems are typically found in relatively sparsely populated areas not otherwise serviced by municipal waste water systems. The purpose of a septic system is to dispose of the wastewater that is generated by the occupants of a home or other building in such a manner that surrounding soils can be used to disperse the wastewater without causing an adverse effect on ground water and, in turn, on public health and the environment in general. To accomplish this task, septic systems are normally comprised of a septic tank, a distribution system and a leaching system.

The septic tank is connected to the plumbing of a home or building by means of a sewer line. The septic tank provides a holding area for the settling of waste solids and for some initial treatment of the waste. Generally, septic tanks have baffles to slow the velocity of the liquid moving through the tank and to prevent solids from leaving the tank. In this way, properly functioning septic tanks produce an effluent of fairly uniform quality.

The effluent then moves to a distribution system that directs the flow of effluent from the septic tank to the leaching system in such a manner as to fully utilize the leaching system. Most systems take advantage of gravity, meaning that flow runs through piping and distribution boxes without the assistance of any mechanical device such as a pump.

The leaching system disperses the sewage effluent over a given underground area and into the surrounding natural soils. There are several types of leaching systems and the specific type used often depends on the surrounding soil conditions. Most residential leaching systems use stone filled leaching trenches but galleries, pits, and beds have also been used.

In the experience of this inventor, private on-site wastewater treatment systems have finite lifetimes due to many factors including household water use, excessive introduction of chemicals into the waste stream, poor maintenance, and environmental factors. Replacement of any septic system component that may be required to deal with remediation of the entire system can be extremely expensive. The reason for this is the fact that the septic system components, for the most part, are buried underground as previously described and are largely inaccessible.

A very significant factor is that passive septic systems typically rely on the presence of indigenous anaerobic bacteria to break down the solid waste introduced to the system. As solid waste enters the septic tank, it flows through the series of baffles that are designed to reduce the velocity of the flow as previously described. Generally, three identifiable layers occur in a septic tank. First, as designed, solid wastes precipitate out of the flow to the bottom of the septic tank. This layer is generally known as sludge. Liquid effluent is the intermediate layer and generally consists of liquids and solids partially broken down into liquids by the anaerobic bacteria that are present in the septic tank. This intermediate layer is drained off to the absorption field. The top layer in the septic tank is generally known as the scum layer. The scum layer is comprised of mostly residual detergents, soaps, fats and oils and has a tendency to float at the top of the septic tank. Optimally, the septic tank is designed such that only the partially treated liquid effluent is permitted to leave the septic tank for the absorption field. Unfortunately, this is not always the case.

The standard septic system is passive in that it relies on the presence of indigenous anaerobic bacteria to break down the solid wastes introduced into the system. Anaerobic bacteria thrive in conditions such as those that exist at the bottom of a septic system, where oxygen is lacking. Accordingly, septic systems are designed to have the capacity to treat a certain amount of solid wastes based on the capability of the indigenous bacteria to break down the solid waste over a certain period of time. Therefore, the average amount of solid waste produced per day should be approximately equal to the amount that the anaerobic bacteria can break down in one day.

Aerobic bacteria are also indigenous and occur naturally within the waste stream. Aerobic bacteria, however, exist and function only where oxygen is present. While aerobic bacteria typically break down solid wastes more quickly than anaerobic bacteria, they are ineffective at breaking down sludge, or the solid layer at the bottom of the septic tank, because there is no oxygen present in that layer. Due to increased installation and operating costs, aerobic systems that would otherwise eliminate this sludge layer are not favored for home use.

As anaerobic bacteria digest solids suspended in the effluent as they make their way to the absorption field or in the absorption field, the suspended solids and accompanying bacteria are then deposited at the interface between the absorption field and the soil surrounding the system. This layer is known as the "bio-mat" and it performs further filtering of the effluent. Unfortunately, the bio-mat layer can grow to a thickness where it completely, or almost completely, impedes absorption.

While there are many ways in which septic systems can fail, two of the most likely modes of failure include the creation and thickening of a bio-mat layer at the absorption field component of the system due to the decomposition of solids within the effluent. Excess sludge and scum from the septic tank can also build up in this bio-mat. For example, when the rate of decomposition caused by the anaerobic bacteria is incapable of keeping up with rate of solids draining into the system, the septic tank fills with sludge. As the sludge level gets higher, the scum level at the top of the tank takes up more space. This causes the liquid effluent to run through the septic tank more quickly, which prevents solids from settling. The solids that fail to settle in the septic tank proceed to the absorption system, where they frequently plug the pores in the soil used for absorption. The scum layer can also find its way out of the septic tank and similarly prevents soil absorption. And if too much of the absorption field is plugged by scum and solids, the effluent will actually back up in the absorption area and cause muddy spots in the area above the absorption field. This is a sign that the absorption field has failed, an extremely malodorous and unsightly condition.

As alluded to earlier, replacement of soil absorption systems is frighteningly costly and heavily regulated by states, counties and municipalities due to the threat that malfunctioning systems pose to the groundwater. Replacement systems are very expensive, with the actual expense depending on the condition of other components in the septic system. Some owners chose to convert their existing passive system to an active system, an even more costly endeavor. Another possible option is to create an above-grade soil absorption system. Above grade systems also have operating—and maintenance expenses and those are even greater than passive systems. Holding tanks are frequently the option of last resort as they are also expensive and need to be regularly pumped by a commercial contractor.

Frequently, a failing or failed soil absorption system can be remediated with the support of naturally occurring aerobic bacteria in the system. In theory, an aerobic system could eliminate or substantially reduce the failure rate of an absorption-field. Unfortunately, aerobic bacteria also require the introduction of oxygen into the waste stream. This inventor has previously identified a need for a temporary means for introducing oxygen into a failed or failing soil absorption field for the purpose of converting the biochemical process from an anaerobic one to an aerobic one. In U.S. patent application Ser. No. 10/764,245, this inventor disclosed that a forced introduction of oxygen into the system would allow the aerobic bacteria to scour the bio-mat, thereby working to reduce the thickness and/or increase the permeability of the bio-mat and permit the system to revert back to an anaerobic passive system as originally designed. There is also a need to alter the biochemical process by conversion of the complete soil absorption component or a localized area of it.

This inventor has also found that the forced introduction of ozone gas can improve performance of the remediation process disclosed above. Ozone, also known as triatomic oxygen or $O_3$, is itself a powerful oxidizing agent. In nature, ozone is created when the electrical current of lightning transforms diatomic oxygen molecules, or $O_2$, into activated triatomic oxygen, or $O_3$. Ozone, however, is also an unstable gas which, at normal temperatures and under all ordinary conditions, spontaneously decomposes to diatomic oxygen or $O_2$. This decomposition is speeded by solid surfaces and by many chemical substances. For this reason, ozone is not encountered except in the immediate vicinity of where it is formed. That is, ozone cannot be stored and must be generated on-site. When ozone is introduced into the system, some of the highly oxidizing agent decomposes bio-degradable matter in the system. The balance of the available ozone rapidly decomposes to oxygen and is available for consumption by the aerobic bacteria.

SUMMARY

The present invention provides a portable wastewater treatment system comprising a wastewater holding tank having an interior adapted to hold wastewater, and a generator positioned to provide ozone, oxygen, or a combination of the two to the interior of the holding tank. In one embodiment, the holding tank comprises a gray-water tank, and the system further comprises a non-potable water tank having an interior. In this embodiment, the system further includes a second generator positioned to provide ozone, oxygen, or a combination of the two to the interior of the non-potable water tank and a conduit coupling the gray-water tank to the non-potable water tank. The system can further include a black-water tank having an interior, a third generator positioned to provide ozone, oxygen, or a combination of the two to the interior of the black-water tank, and a conduit coupling the black-water tank to the non-potable water tank. The system can further include a toilet having an inlet and an outlet, a first conduit coupling the non-potable water tank to the inlet of the toilet, and a second conduit coupling the outlet to the black-water tank. The system can also include a potable water tank, a point of water usage coupled to the potable water tank, and a fourth generator positioned to provide ozone, oxygen, or a combination of the two to the potable water tank.

The above system can be used to treat wastewater in a portable system, such as might be found in a vehicle or portable restrooms.

Other aspects of the invention will become apparent by consideration of the detailed description and accompanying drawings.

BRIEF DESCRIPTION OF THE DRAWINGS

FIG. 1 is a perspective view of a typical private wastewater treatment system of the type that the method and apparatus of the present invention could be used with.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
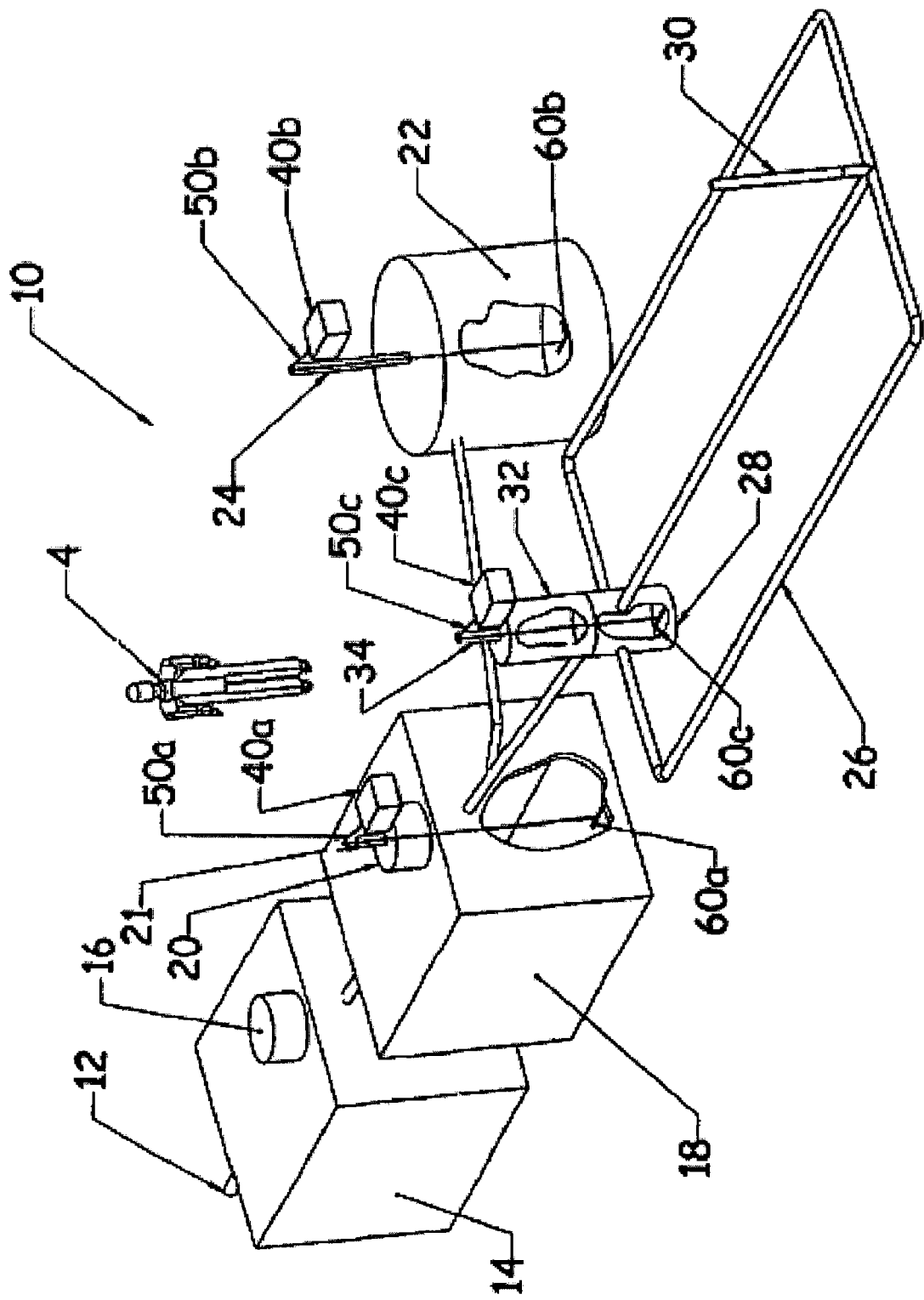

Reference is now made to the drawings wherein like numbers refer to like elements throughout. FIG. 1 illustrates a septic system, generally identified 10 with which the improved apparatus and method of the present invention is intended to be used. It is to be understood, however, that the precise configuration of the improved system is not a limitation of the present invention and could assume any number of sizes and layouts. The septic system 10 shown is for illustration purposes only. A six foot tall man 4 is included for relative size reference as well.

Figure 3:
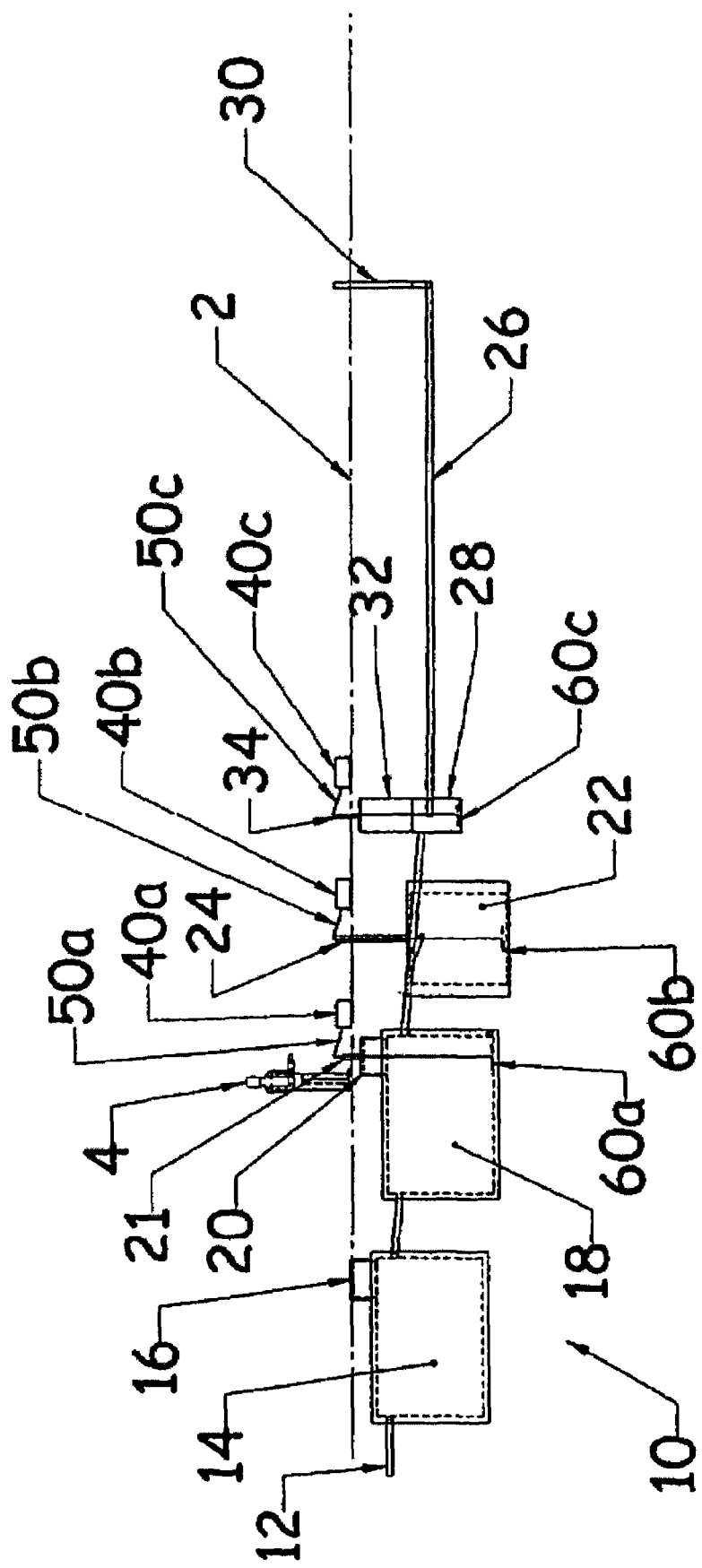
FIG. 3 is a side elevational view of the system shown in FIG. 1.

As shown in FIG. 3, the septic system 10 lies, for the most part, below earth grade 2. The system 10 includes a pipe 12 leading from a home or building (not shown) which pipe 12 is connected to a first septic tank 14. The first tank 14 may or may not have a vented cover. As shown, the first tank 14 includes a riser 16. The first tank 14 is, in turn, connected to a second tank 18. This second tank 18 may or may not have a vented cover as well. As shown, the second tank 18 includes a riser 20 and a vent 21. As will become apparent later in this detailed description, if either the first or second tanks 14, 18 do not have a vented cover atop of 16, 20, respectively, one may need to be added in order to utilize the apparatus of the present invention. This second tank 18 may also be a pumping chamber. It should also be noted that the second tank 18 lies slightly below the first tank 14 such that gravity affects a downstream flow of effluent from one tank to the other.

The second tank 18 is, in turn, connected to a dry well or seepage pit 22. The dry well or seepage pit 22 includes a vent 24. An alternate to a dry well or seepage pit 22 is an absorption field 26 or an above grade mound system (not shown). The absorption field 26 may include a distribution box 28 and a vent 30. The distribution box 28 of the absorption field 26 may or may not include a distribution box riser 32 and a distribution box vent 34. Again for reasons that will become apparent later in this detailed description, a distribution box riser 32 will likely need to be added to the system 10 if one is not already included. As shown in FIG. 3, it will be shown that the downward flow of effluent is affected by gravity. Alternatively, the effluent can be moved by a positive pressure pump to the soil distribution component of the system.

Figure 4:
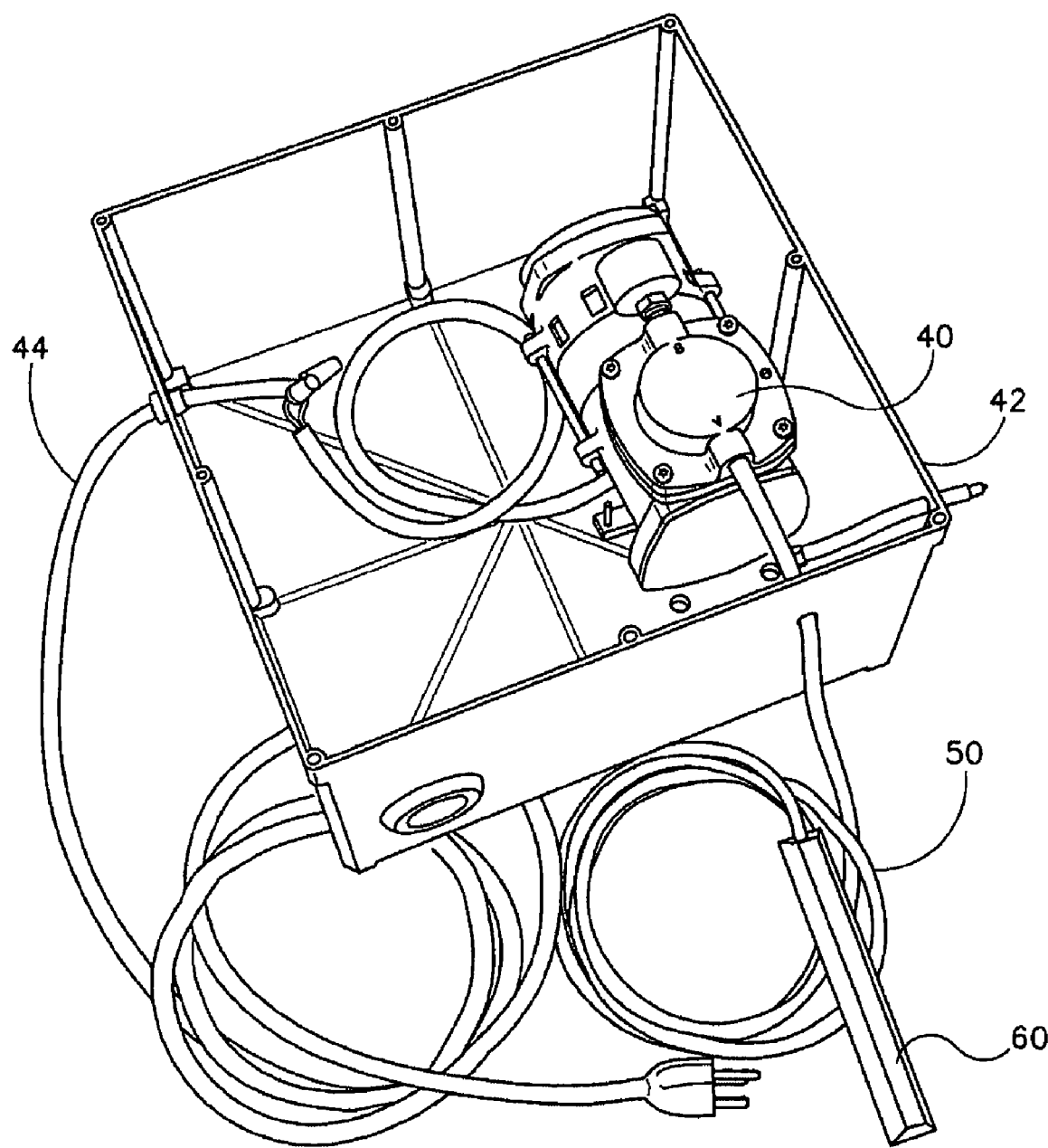
FIG. 4 is a perspective view of the components of an apparatus constructed in accordance with the present invention.

In general, the improved apparatus of the present invention is comprised of at least one high volume ozone-generating pump 40 connected to at least one low pressure drop sintered air stone 60. The air stone 60 has a relatively large surface area, See FIG. 4. The pumps 40 and all internal electrical connections are packaged in a weatherproof container 42. The external electrical connection 44 is connected via an extension cord to a circuit breaker or may be permanently hardwired to an electrical junction box. The pumps 40 force oxygen and ozone, or ozone only, into clear vinyl tubing 50, although many types of tubing are acceptable and would be within the scope of the present invention. The tubes, or aeration lines, 50 are then connected to the air stones 60, which are placed at various locations inside the septic system 10. It is to be understood that at least one high volume ozone-generating pump 40 be utilized to introduce ozone into the system. Other pumps 40 may be used with or without ozone-generating capabilities.

Figure 2:
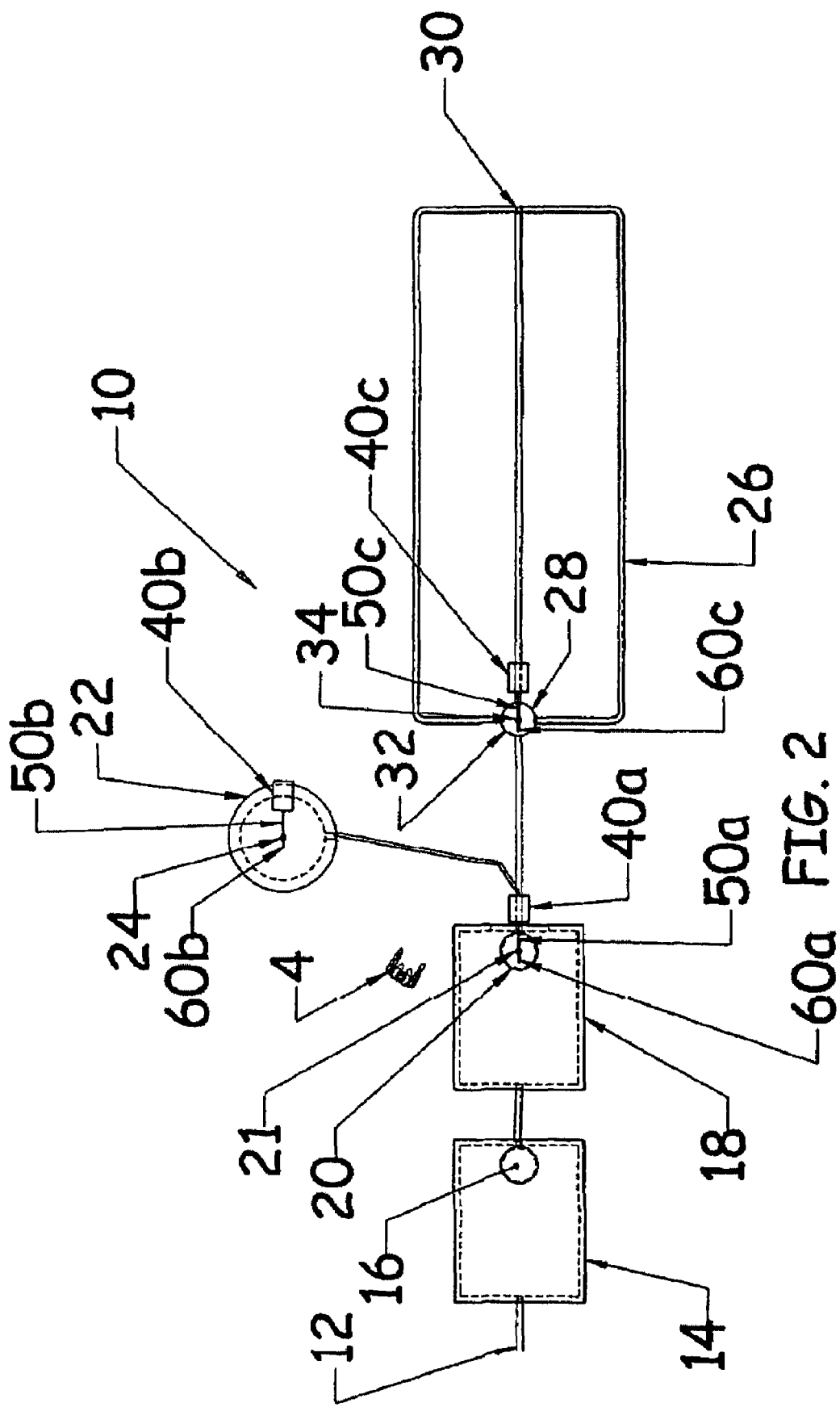
FIG. 2 is a top plan view of the system illustrated in FIG. 1.

As shown in FIG. 1, and using the improved system illustrated therein as representative of a typical system, the preferred location for the aeration lines 50 is in the vent pipe 34 of the distribution box 28, the vent pipe 24 of the dry well 22, or the vent pipe 21 of the second tank or pumping chamber 18. For example, as shown in FIGS. 1, 2 and 3, a first pump 40a, tubing 50a, and air stone 60a are used with the second tank 18. At that location, the first air stone 60a and a portion of the tubing 50a are inserted into the second tank 18 via the tank vent 21. A second pump 40b, tubing 50b, and air stone 60b are used with the dry well or seepage pit 22, and a third pump 40c, tubing 50c, and air stone 60c are used with the distribution box 28 of the absorption field 26. If the standing effluent level in the distribution box 28 is not of adequate depth, an alternate location should be considered. If a vent pipe or well is not available at this location, one may be installed for a rather nominal cost. In most cases, the standard vent cap can be used during remediation.

It is to be understood that the improved apparatus of the present invention could be installed in alternate locations. For example, the aeration lines could be installed in the final septic tank or pumping chamber of a multiple tank system or in the septic tank in a single tank system immediately prior to the outlet to the soil absorption system. As an alternate to installing through a vented cover, small holes can be drilled through the lid of the tank or compartment and the aeration lines installed. Installation of an approved effluent filter is recommended with this application method.

Remediation is a lengthy process. However, the improved method, and apparatus of the present invention provides some degree of immediate relief quite quickly. Thereafter, the rate of remediation tapers off over time. Substantial remediation can occur in most systems within about 6 months, although other systems may require as long as one year. If, even then, the system is not completely remediated, the equipment can be operated for longer periods without detrimental effects to the system. One advantage to the use of at least one ozone-generating pump 40 within the system is that the application of ozone to any medium, liquid or gas, does not add other chemicals to the system.

Depending on conditions, the introduction of ozone, approved bacteria, enzymes and vitamins may expedite the remediation process. Unfortunately, after the remediation equipment has been removed, there will be a lag of decomposition activity while the aerobic bacteria die and the anaerobic bacteria again takes over. Many types of bacteria are available for purchase which include both aerobic, and or anaerobic and or facultative that can expedite the system's return to normalcy. Addition of these products is not required in the improved method of the present invention but may be considered to enhance performance.

In the experience of this inventor, the length of time required to remediate a failing or failed absorption field depends on several factors, including, but not limited to, system type, size, severity of failure, site conditions, precipitation, and the average temperature during the remediation process. Several trials have been conducted that show the influences of these conditions. All trials showed successful application of the remediation program. The trials showed little change in measured effluent in the absorption system during the first several days of remediation. The following weeks showed a significant drop in effluent levels. Over time, the rate of effluent reduction decays. Rapid effluent drop near the top of the absorption system is to be expected as it is not normally used until the lower levels become plugged and the effluent levels begin to rise. Daily specific hydraulic loading and local precipitation had similar effects on all systems.

In another particular application, the present invention provides for use of one Enaly OZX-1000U ozone generator 40, two 12 inch Micro-Bubble air stones 60, 20 feet of tubing 50, a pair of "tees", one tube weight, a weatherproof container 42, an extension cord 44 and a UL rated ground fault circuit interrupter, or GFCI. See also FIG. 4. All electrical connections for the generator 40 are located inside the weatherproof container 42. An extension cord runs to a GFCI and then to the power source. The generator 40 used in this embodiment of the invention provides an ozone output of 1000 mg/hour with a pump output of 4 to 5 liters per minute, although other generators of various output capacities could be used. Other sizes and types of tubing 50 would also work equally well. Additionally, several types of air stones 60 other than that specified will work. The air stones 60 are attached to the end of the tubing 50 and distribute ozone more effectively to wet areas. It would also be possible to achieve favorable remediation by using a combination of air pumps and ozone generators 40, which combination would still come within the scope of the present invention.

In the opinion of this inventor, installation of the improved device of the present invention is relatively simple and straightforward and can frequently be accomplished by the homeowner. The user should first identify the components of his or her particular septic system. Frequently, the local government or health department will have information about the homeowner's septic system on file. However, as a general rule, home septic systems are comprised of a pipe running from the house to the septic tank, in some cases, a pipe running to a second septic tank or pumping chamber, and a typical distribution box that splits the effluent into several pipes going into the absorption field, as discussed above. With this configuration, there are several different locations in which the improved apparatus of the present invention can be installed to eliminate excess bio-mat. The preferred location to install the remediation equipment is as close to the bio-mat problem as possible. Therefore, in a septic system having a first septic tank 14, a second septic tank or pumping chamber 18, a dry well 22 and a distribution box 28 leading to one or more absorption field vents 3D, 34, the preferred location would be in the dry well or seepage pit 22. A secondary, but still beneficial location would be to install the aerator stone 60 in the distribution box 28. However, it would also be beneficial to install the aerator stone 60 of the present invention after the second septic tank 18. Obviously, different septic systems will require slightly different installations.

In the event that a septic system 10 does not have a vent at a convenient location to monitor the progress of the remediation method, a monitoring well can be added to a conventional soil absorption system by driving a "sandpoint" well point not less than 12 inches and not more than 24 inches below the bottom of the soil absorption vent pipe 30. The bottom of the "sandpoint" should be driven to the bottom of the soil absorption field 26. Therefore, the effluent level in the "sandpoint" can then be monitored.

Figure 5:
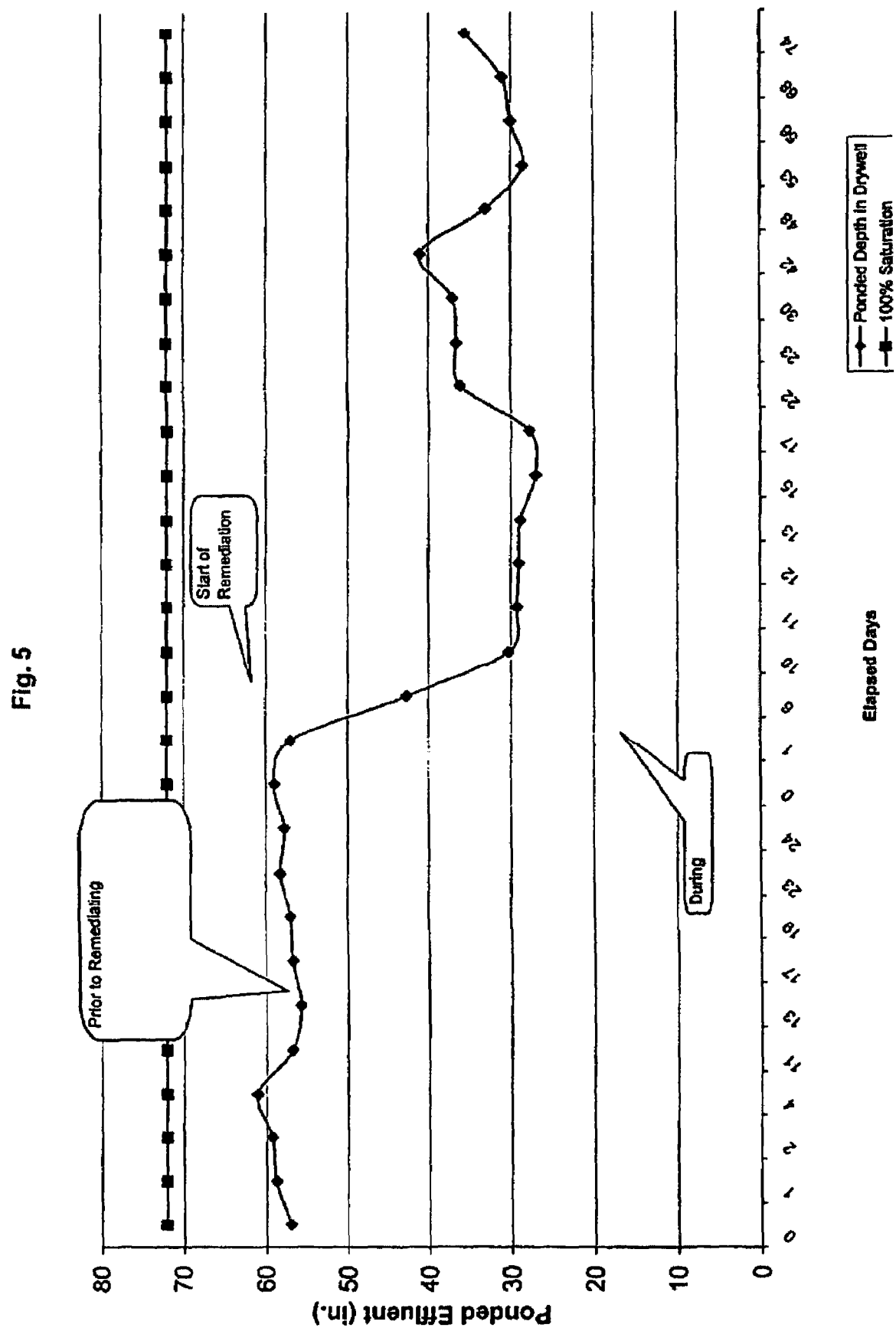
FIG. 5 is a graph of ponded effluent depth versus elapsed time in a typical application using the method and apparatus of the present invention.

The improved remediation apparatus of the present invention should be allowed to operate for six months. If the system 10 is severely plugged, the equipment can operate for more time without damaging the septic system. The depth of the ponded effluent should be recorded regularly. Frequently, plotting the data on a program such as Microsoft® Excel will enable the user to predict the amount of time required for remediation. A good estimate of the required operating time can be obtained by examining a plot of the Ponded Effluent Depth as shown in FIG. 5. Normally, treatment should continue for two months after the ponded effluent depth stabilizes. For the system plotted in FIG. 5, the owner of the septic system might expect to operate the system a total of 120 days. The user should expect some anomalous measurements during the remediation period. For example, in FIG. 5, the ponded effluent depth in the septic system declined for several days, remained steady, and then rose again. This rise could be attributed to many things such as increased water usage and precipitation.

This improved process and apparatus can also be applied to the effluent contained in a holding tank. In this application, the effluent category can be changed from untreated waste to treated waste. This re-categorization may reduce the pumping cost associated with the holding tank. Typically, untreated waste of a holding tank must be disposed of in a waste treatment facility. The waste treatment facility charges the waste hauler for this service, who in turn charges the owner of the holding tank. Treated waste can be alternatively distributed into the surface of the ground at less cost.

Yet another application of this improved process and equipment is in mobile and portable holding tanks. Mobile and portable holding tanks can be found in but not limited to recreational vehicles, camping trailers, boats, etc. These holding tanks are anaerobic in nature and emit odorous methane gases. Owners typically add chemical odor controllers containing paraformaldehyde, alkyl dimethyl benzyl ammonium chloride (quaternary ammonium) or other disinfectants. These chemicals are toxic and detrimental to a private on-site wastewater treatment system. Many rural campgrounds are serviced by private on-site wastewater treatment systems. Many campgrounds discourage or have banned the use of these additives. As alluded to earlier, the application of ozone to any medium does not add any other chemicals. In this application, the naturally occurring aerobic bacteria can eliminate the odors of a blackwater or sewage holding tank. In fact, ozone in its gaseous state is a proven deodorizer for a variety of odorous materials. Ozone also has the proven ability to convert bio-refractory organic materials to biodegradable materials. Thus, ozone oxidation can produce wastewater with lower concentrations of problematic organic compounds. The equipment will keep the holding tank significantly free of sludge build up on the sidewalls and depth sensors. Application of this improved process to the gray water holding tank will also reduce odor and sludge build up on the sidewalls and depth sensors of the holding tank. This treated gray water is then suitable for the use of flushing the toilet.

Figure 6:
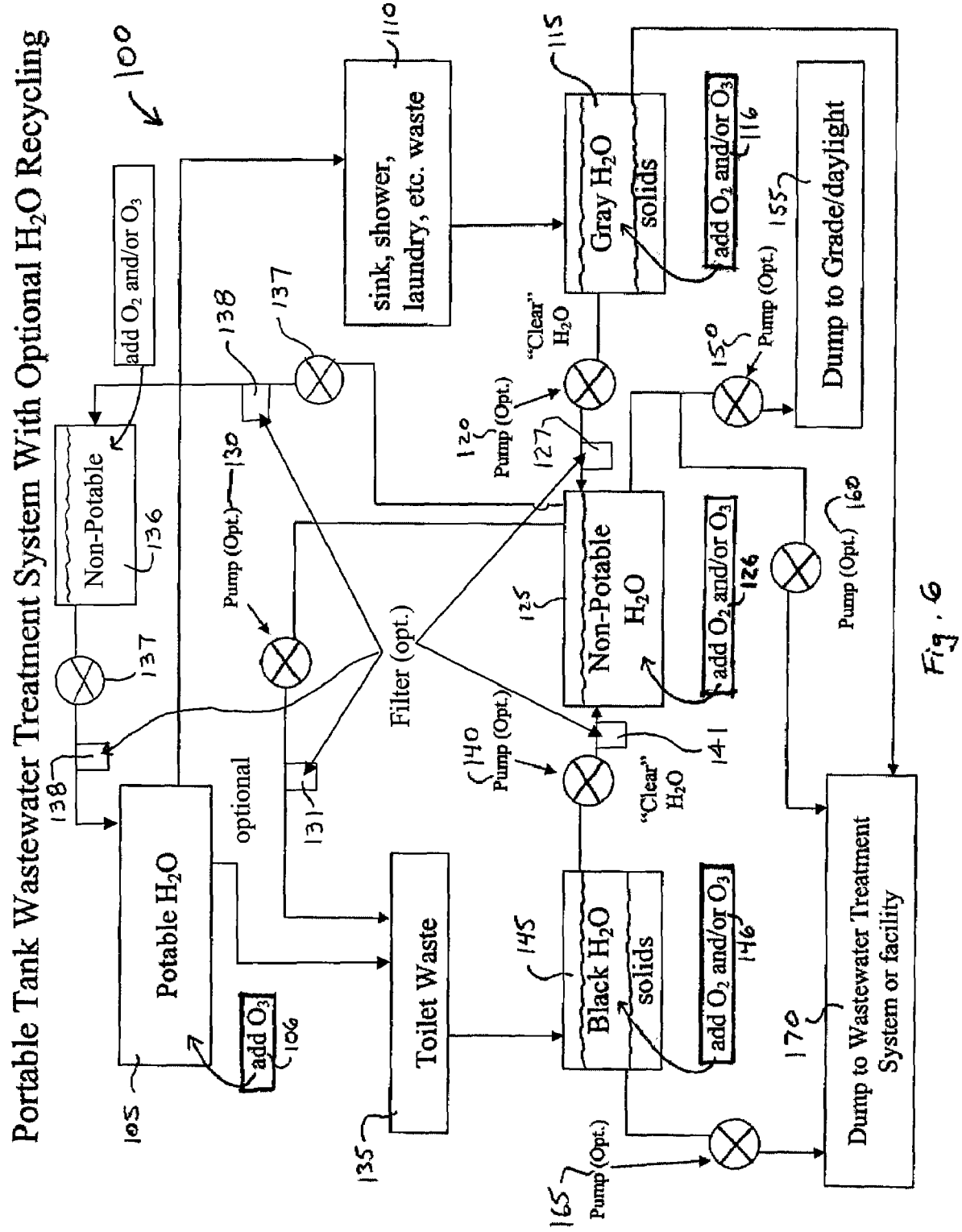
FIG. 6 is a schematic diagram of a portable tank wastewater treatment system with optional water recycling.
Figure 7:
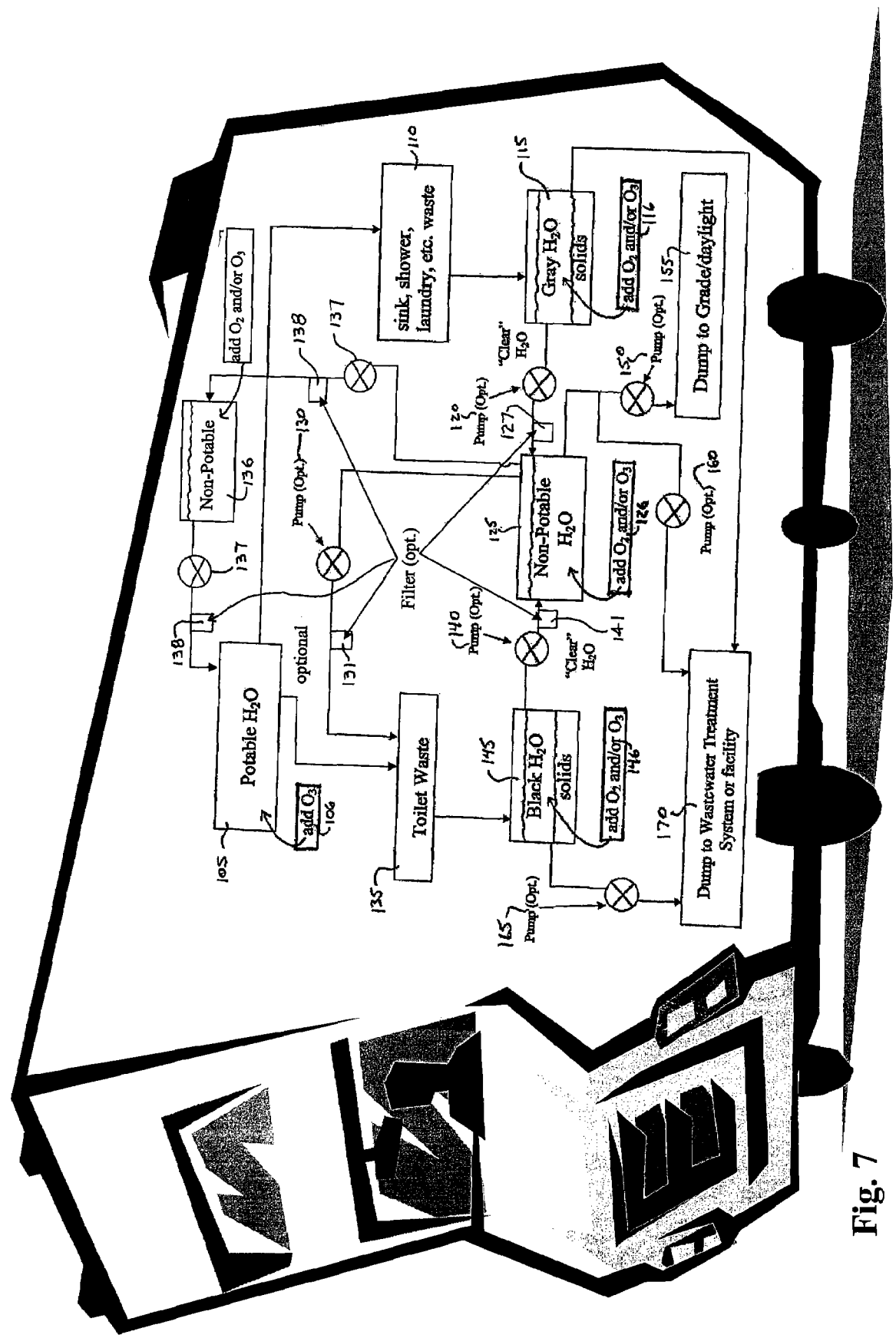
FIG. 7 is the system of FIG. 6 implemented in a vehicle.

An embodiment of the above application is shown in FIGS. 6 and 7, and provides a portable tank wastewater treatment system that may be used in mobile and portable holding tanks. Such holding tanks may be found in but not limited to recreational vehicles 102, camping trailers, boats, portable restrooms, and non-vehicle portable restrooms. FIG. 6 schematically represents a portable tank wastewater treatment system 100, with which the improved apparatus and method of the present invention is intended to be used. It is to be understood, however, that the precise configuration of the improved system is not a limitation of the present invention and could assume any number of sizes and layouts. The portable tank wastewater treatment system 100 shown is for illustration purposes only.

The portable tank wastewater treatment system 100 includes a potable water source 105, which may be treated with an ozone generating device 106 before it is sent to a point of use 110. The point of use 110 may be a sink, shower, laundry machine, toilet, etc. After the water is expelled from the point of use 110 it enters a grey water holding tank 115.

While in the grey water holding tank 115, the water is treated with a diatomic oxygen, ozone, or a combination of the two, by a generating device 116, and is separated into solids, grey water, and clear water. The clear water is released from the grey water holding tank 115 and sent to a non-potable water holding tank 125, while the solids and grey water are dumped to a wastewater treatment system 170 which may be a holding tank, wastewater facility, etc. The transfer of clear water to the non-potable water holding tank 125 may be aided by an optional pump 120. An optional filter 127 may be installed before or after the pump.

The water that is sent to the non-potable water holding tank 125 is again treated with a diatomic oxygen and ozone, or ozone only, generating device 126 before it is used to flush a toilet 135. The water may be pumped via an optional pump 130 to the toilet 135. An optional filter 131 may be installed before or after the pump. The non-potable water holding tank 125 may additionally dump a portion of the treated water to a grade/daylight site 155, aided by an optional pump 150, or to the wastewater treatment system 170, aided by an optional pump 160.

The non-potable water holding tank 125 may additionally provide water to the potable water tank 105 via an intermediate holding tank 136. This can be facilitated using optional pumps 137 and filters 138. In addition, to improve the quality of the water, it is preferred to treat the water in the intermediate holding tank with oxygen, ozone, or a combination of the two.

The toilet waste is expelled from the toilet 135 to a black water holding tank 145 where the water is again treated with a diatomic oxygen and ozone, or ozone only, generating device 146. While in the black water holding tank 145, the water is separated into clear water, black water, and solid waste. The clear water is returned to the non-potable water holding tank 125, while the black water and solid waste is dumped to the wastewater treatment system 170. Transfer to the non-potable water holding tank 125 may be aided by an optional pump 140, and filtered by an optional filter 141. Dumping to the wastewater treatment system 170 may be aided by an optional pump 165.

As illustrated with respect to the first embodiment, the ozone generating device 106 may include an air stone similar to the air stone 60 and a pump similar to pump 40. In addition, the several diatomic oxygen and ozone, or ozone only, generating devices 116, 126, and 146 may also include such an air stone and pump. Also similar to the first embodiment, the air stones may be connected to the pumps with clear vinyl tubing similar to the tubing 50.

Based on the foregoing, it will be apparent that there has been provided an improved apparatus and method for introducing oxygen and ozone, or ozone only, into a failed or failing soil absorption field for the purpose of converting the biochemical process from an anaerobic one to an aerobic one. The forced introduction of oxygen and ozone, or ozone only, into the system allows the aerobic bacteria to scour the bio-mat, thereby working to reduce the thickness of the bio-mat and permitting the system to revert back to an anaerobic passive system as originally designed. By using, the improved method and apparatus of the present invention, the biochemical process is altered by complete or localized conversion of the soil absorption component as above described. The improved apparatus of the present invention may seem quite simple in practice compared to existing aerobic systems. However, the goal of this improved approach to remediation is value based. The idea is to provide an inexpensive and effective alternative to replacing the absorption system of a septic system. This has been accomplished by the improved method and apparatus of the present invention.

In addition, a second embodiment provides an improved apparatus and method for introducing oxygen, ozone, or a combination of the two, into a portable tank wastewater treatment system for the purpose of water recycling, as well as the reduction and prevention of the build up of odorous organic material within the system. The forced introduction of oxygen, ozone, or a combination of the two, into the system at several key points allows aerobic bacteria to better process the wastewater. In addition, ozone has proven deodorizing characteristics and reduces the amount of odorous organic compounds often found in portable wastewater tanks thus allowing a user to maintain an acceptable environment near the wastewater tank without the use of prohibited or discouraged chemicals.

Thus, the invention provides, among other things, an improved portable tank wastewater treatment system method and apparatus. Various features and advantages of the invention are set forth in the following claims.

What is claimed is:

1. A portable wastewater treatment system comprising:
    a wastewater holding tank having an interior adapted to hold wastewater, the wastewater holding tank including a gray-water tank;
    a non-potable water tank having an interior;
    a black-water tank having an interior;
    a first generator positioned to provide ozone, oxygen, or a combination of the two to the interior of the holding tank;
    a second generator positioned to provide ozone, oxygen, or a combination of the two to the interior of the non-potable water tank;
    a third generator positioned to provide ozone, oxygen, or a combination of the two to the interior of the black-water tank;
    a conduit coupling the gray-water tank to the non-potable water tank; and
    a conduit coupling the black-water tank to the non-potable water tank.

2. A portable wastewater treatment system as claimed in claim 1, further comprising:
    a toilet having an inlet and an outlet;
    a first conduit coupling the non-potable water tank to the inlet of the toilet; and
    a second conduit coupling the outlet to the black-water tank.

3. A portable wastewater treatment system as claimed in claim 2, further comprising:
    a potable water tank;
    a point of water usage coupled to the potable water tank; and
    a fourth generator positioned to provide ozone, oxygen, or a combination of the two to the potable water tank.

4. A method of treating wastewater in a portable system, comprising:
    providing wastewater to a holding tank that includes a gray-water tank;
    moving the wastewater from the gray-water tank to a non-potable water tank;
    moving wastewater from a toilet to a black-water tank;
    treating the wastewater in the holding tank with ozone, oxygen, or a combination of the two;
    treating the wastewater in the non-potable water tank with ozone, oxygen, or a combination of the two; and
    treating the wastewater in the black-water tank with ozone, oxygen, or a combination of the two.

5. A method as claimed in claim 4, further comprising moving wastewater from the non-potable tank to the toilet.

6. A method as claimed in claim 5, further comprising:
    providing a potable water tank;
    moving water from the potable water tank to a point of water usage; and
    treating the water in the potable water tank with ozone, oxygen, or a combination of the two.

7. A vehicle and wastewater treatment system assembly comprising:
    a vehicle;
    a wastewater holding tank mounted to the vehicle and having an interior adapted to hold wastewater, the wastewater holding tank including a gray-water tank;
    a non-potable water tank mounted to the vehicle and having an interior;
    a black-water tank mounted to the vehicle and having an interior;

a first generator positioned to provide ozone, oxygen, or a combination of the two to the interior of the holding tank;

a second generator positioned to provide ozone, oxygen, or a combination of the two to the interior of the non-potable water tank;

a third generator positioned to provide ozone, oxygen, or a combination of the two to the interior of the black-water tank;

a conduit coupling the gray-water tank to the non-potable water tank; and a conduit coupling the black-water tank to the non-potable water tank.

8. A vehicle and wastewater treatment system assembly as claimed in claim 7, further comprising:

a toilet mounted to the vehicle and having an inlet and an outlet;

a first conduit coupling the non-potable water tank to the inlet of the toilet; and a second conduit coupling the outlet to the black-water tank.

9. A vehicle and wastewater treatment system assembly as claimed in claim 8, further comprising:

a potable water tank mounted to the vehicle;

a point of water usage mounted to the vehicle and coupled to the potable water tank; and a fourth generator positioned to provide ozone, oxygen, or a combination of the two to the potable water tank.

* * * * *